(12) United States Patent
Guido et al.

(10) Patent No.: US 7,552,401 B2
(45) Date of Patent: Jun. 23, 2009

(54) DETACHABLE AND REATTACHABLE PORTAL PAGES

(75) Inventors: Patrick R. Guido, Cary, NC (US); Steven P. Kim, Raleigh, NC (US); Robert C. Leah, Cary, NC (US); Paul F. McMahan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 10/710,943

(22) Filed: Aug. 13, 2004

(65) Prior Publication Data
US 2006/0036969 A1 Feb. 16, 2006

(51) Int. Cl.
G06F 3/048 (2006.01)
(52) U.S. Cl. .................... 715/838; 715/842; 715/835
(58) Field of Classification Search ......... 715/741–744, 715/736–739, 803–805, 835–840, 853–855, 715/969, 976–977, 777; 709/203, 217–219
See application file for complete search history.

(56) References Cited

U.S. PATENT DOCUMENTS

| | | | |
|---|---|---|---|
| 6,516,349 B1 | 2/2003 | Lieberman | |
| 6,981,223 B2 * | 12/2005 | Becker et al. | 715/753 |
| 2002/0029296 A1 | 3/2002 | Anuff et al. | |
| 2002/0052954 A1 | 5/2002 | Polizzi et al. | |
| 2002/0120666 A1 | 8/2002 | Landsman et al. | |
| 2003/0117437 A1 | 6/2003 | Cook et al. | |
| 2003/0126558 A1 * | 7/2003 | Griffin | 715/513 |
| 2003/0145275 A1 * | 7/2003 | Qian et al. | 715/500 |
| 2004/0003096 A1 | 1/2004 | Willis | |
| 2004/0107249 A1 | 6/2004 | Moser et al. | |
| 2004/0113948 A1 * | 6/2004 | Shahrbabaki et al. | 345/777 |

* cited by examiner

*Primary Examiner*—Stephen Hong
*Assistant Examiner*—Boris Pesin
(74) *Attorney, Agent, or Firm*—Charles L. Moore; Moore & Van Allen, PLLC

(57) ABSTRACT

In accordance with an embodiment of the present invention, a portal environment may include at least one detachable portal page. The portal environment may also include a detach feature or element associated with the at least one detachable portal page. In accordance with another embodiment of the present invention, a method to detach and reattach at least one portal page associated with a portal environment may include detaching a selected portal page in response to activating a detach feature or element. The method may also include reattaching the detached portal page in response to activating a reattach feature or element. The method may further include forming a placeholder in the portal environment for each detached portal page when detached, wherein the placeholder is formed in response to the portal page being detached and wherein the placeholder is substantially smaller than the portal page to permit a plurality of portal pages and at least one portlet contained within each portal page to be presented via their respective placeholders to a user at the same time.

16 Claims, 7 Drawing Sheets

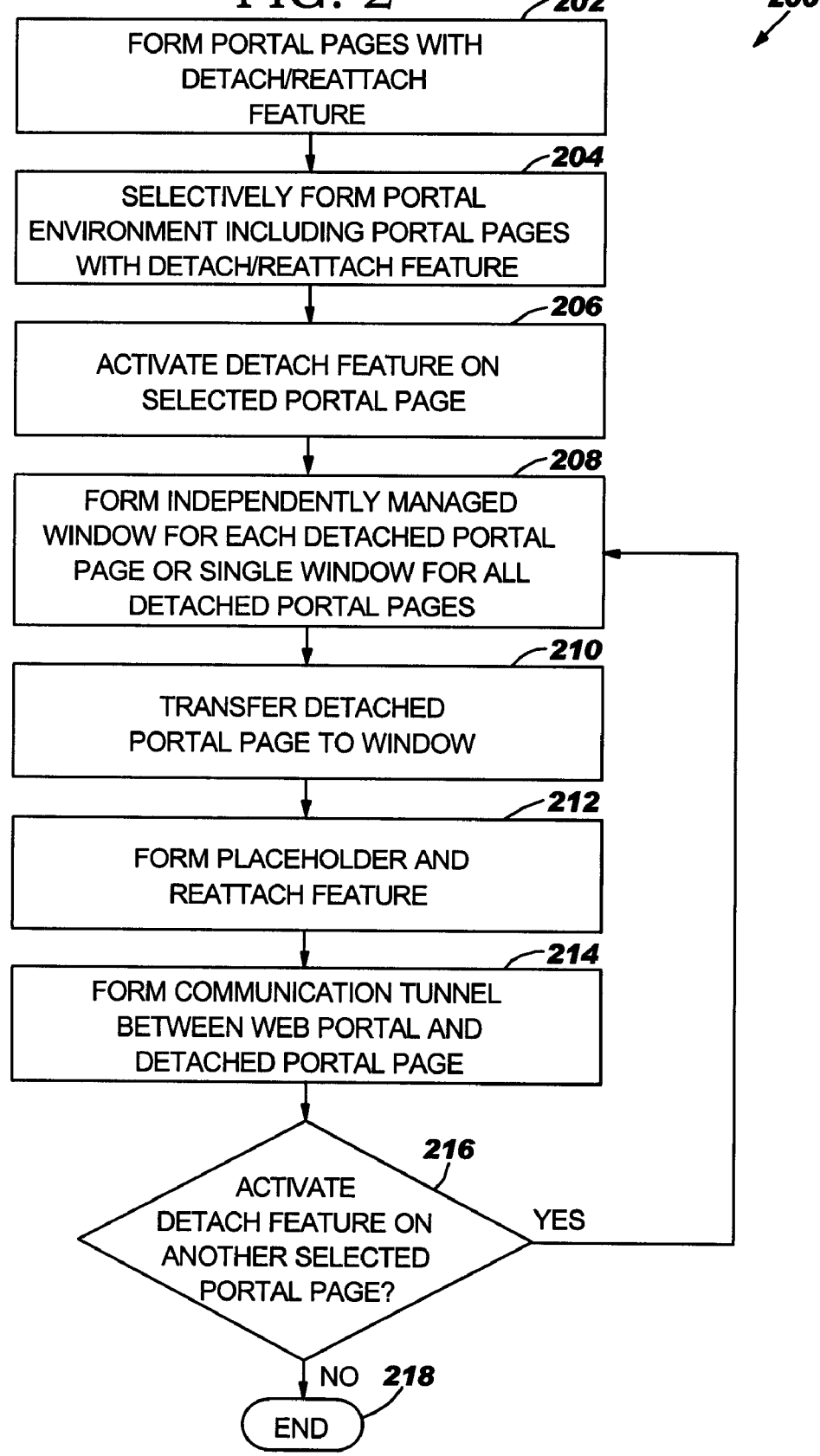

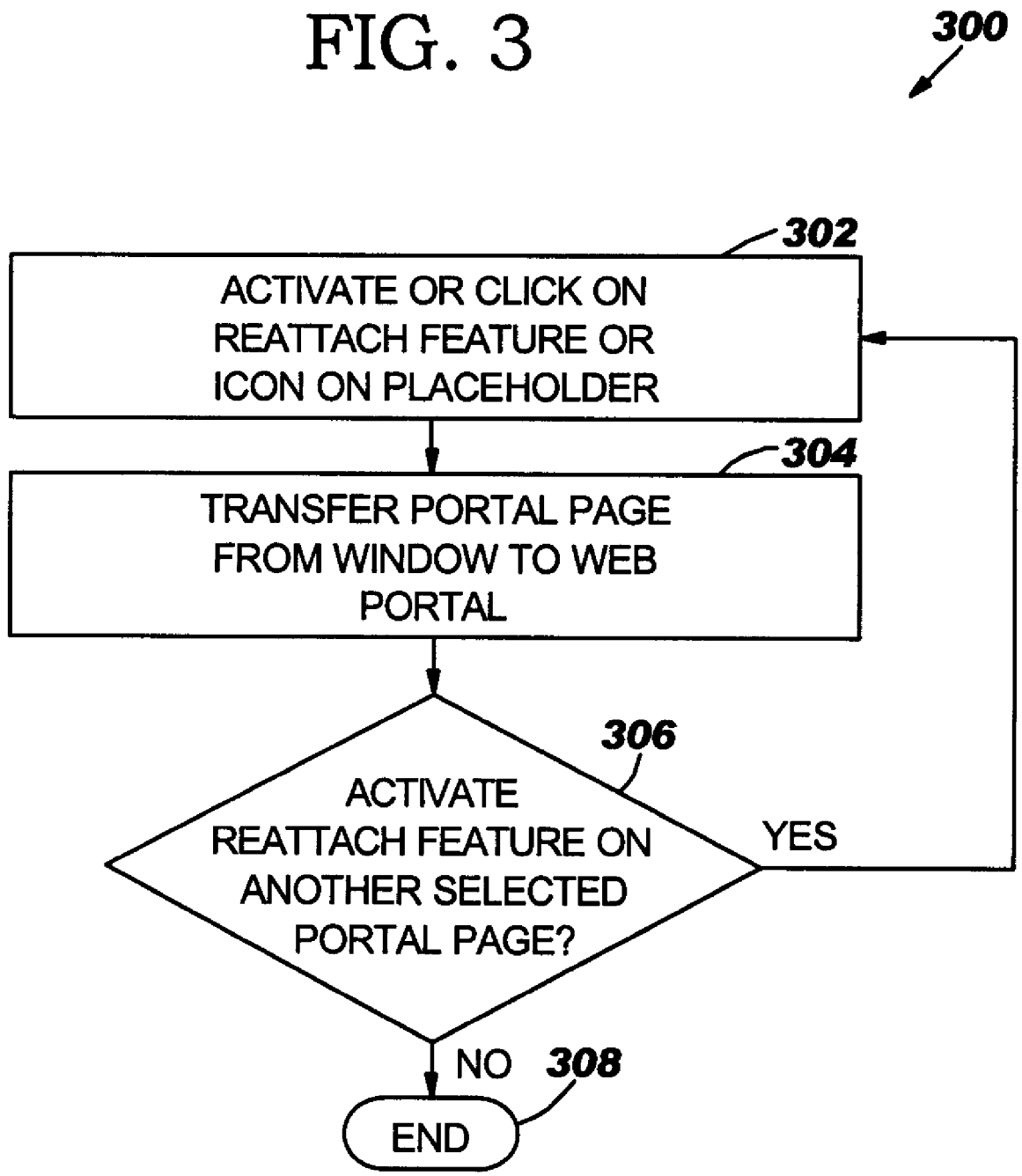

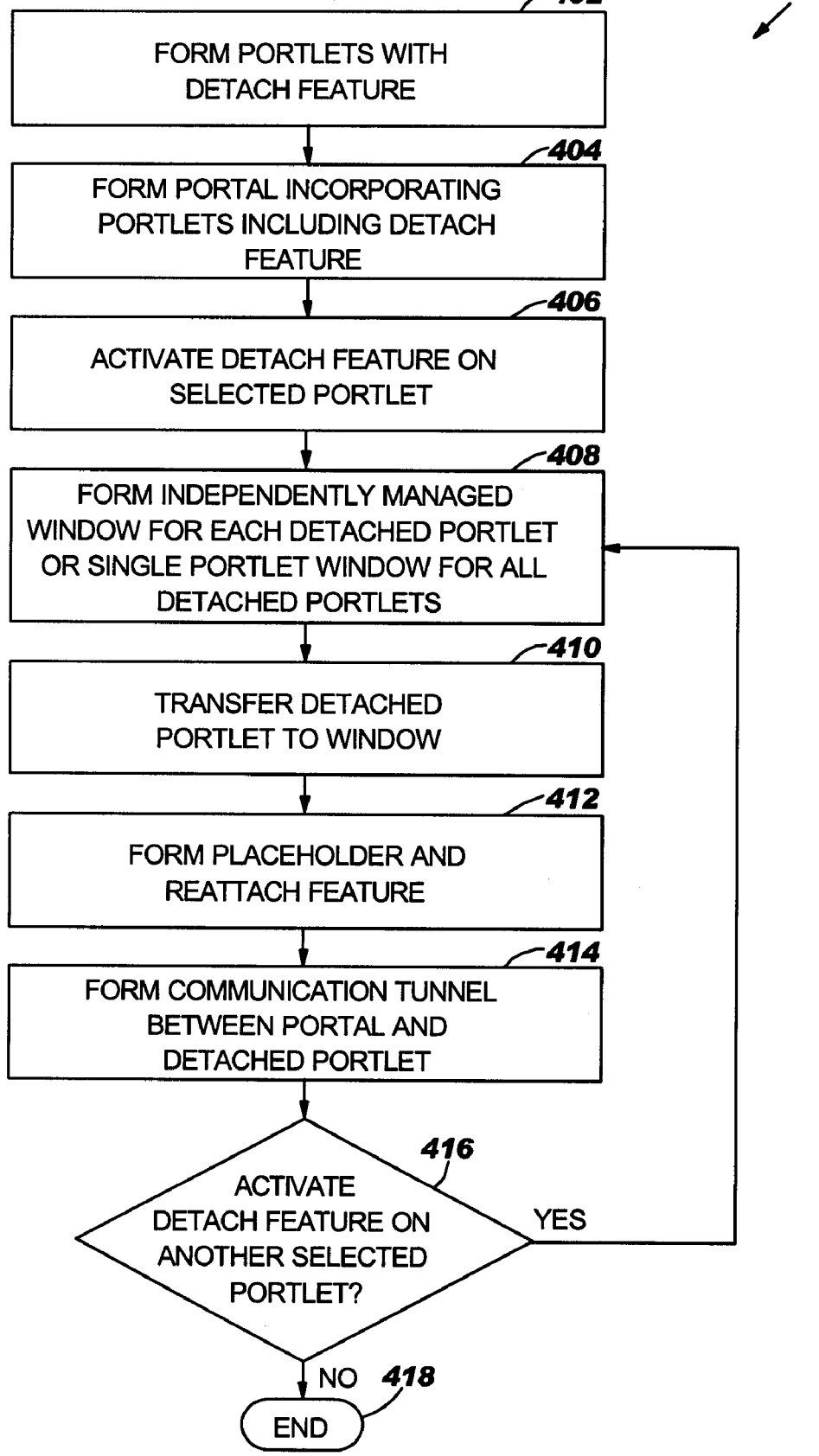

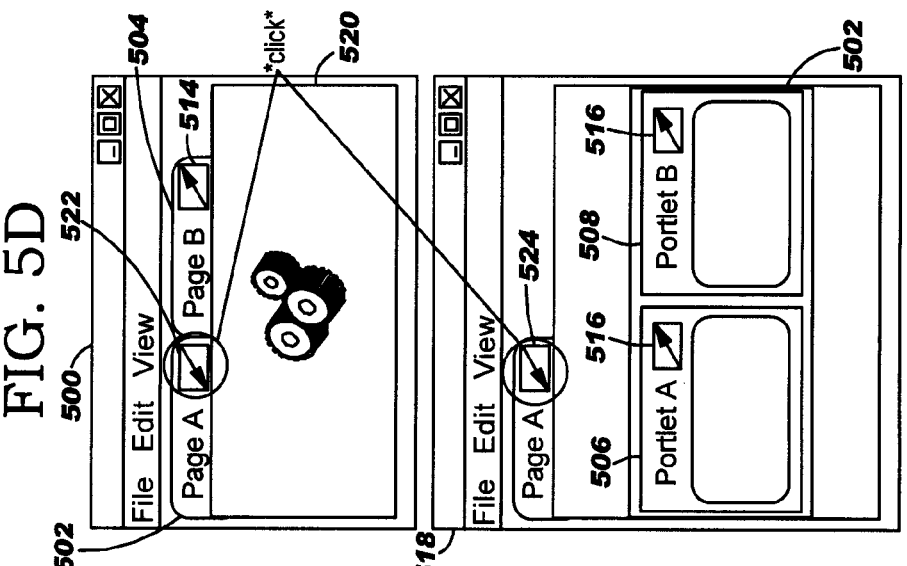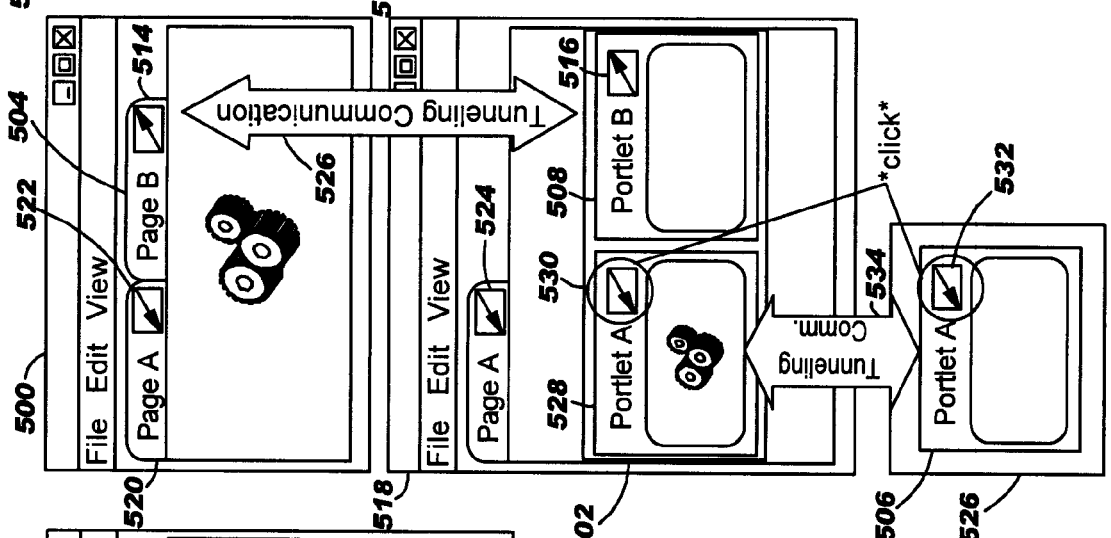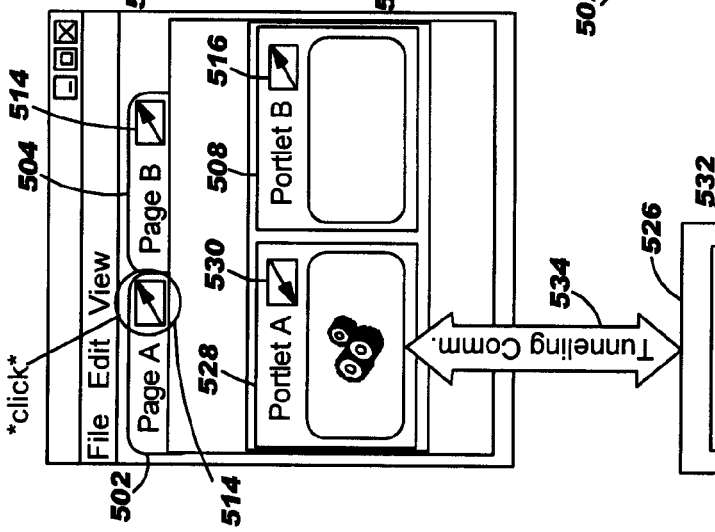

DETACHABLE AND REATTACHABLE PORTAL PAGES

CROSS REFERENCE TO RELATED APPLICATIONS

This application is related to co-pending patent application Ser. No. 10/708,971, filed Apr. 5, 2004, entitled "Portal Including Detachable and Reattachable Portlets," which is incorporated herein in its entirety by reference and is assigned to the same assignee as this application.

BACKGROUND OF INVENTION

The present invention relates to portal pages and web portals for accessing multiple portal pages and more particularly to detachable and reattachable portal pages.

A portal is a point of access to data and applications that provides a unified and personalized view of information and resources. Typically, a portal is implemented as one or more portal pages on a website. Portal pages can integrate many elements, such as live data feeds, static information, multimedia presentations and similar content. Currently, within a portal environment, the purpose of a portal page in to organize and contain a given set of portlets. Portlets are reusable components that may provide access to applications, web-based content, and other resources, such as the live data feeds, static information and multimedia presentations, as mentioned above. Because of the integrated nature of portal pages, a user does not have the ability to view and interact with multiple pages at the same time. FIG. 1 is an example of a portal environment 100 in which a portal page 102 identified by a tab 104 labeled "My Finances" is currently being displayed or presented to a user. Other portal pages that may be accessed or activated through the portal environment 100 are identified by their corresponding tabs, such as "Documents" tab 106, "Welcome" tab 108, "My Work" tab 110, "My Newsroom" tab 112 and "My Star Trek" tab 114. The portal pages can typically only be switched from one another via the use of the integrated tabs 104-114 that may be located at the top of each corresponding portal page 100, such as that illustrated in FIG. 1. Only one portal page may be viewed on a user's desktop or active at any given time.

Additionally, other problems may occur as a result of the tight coupling of portal pages within a portal environment. One problem is that users do not have the ability to refresh multiple pages because only one page can be viewed or active at any given time. Another problem is related to dynamic updates for a portal page. Updates, such as alerts or the like, cannot be surfaced or brought to a user's attention because only one portal page may be viewed or active on a user's desktop at any given moment. Further, portlets on separate portal pages cannot communicate with one another.

SUMMARY OF INVENTION

In accordance with an embodiment of the present invention, a portal environment may include at least one detachable portal page. The portal environment may also include a detach feature or element associated with the at least one detachable portal page.

In accordance with another embodiment of the present invention, a method to detach and reattach at least one portal page associated with a portal environment may include detaching a selected portal page in response to activating a detach feature or element. The method may also include reattaching the detached portal page in response to activating a reattach feature or element. The method may further include forming a placeholder in the portal environment for each detached portal page when detached, wherein the placeholder is formed in response to the portal page being detached and wherein the placeholder is substantially smaller than the portal page to permit a plurality of portal pages and at least one portlet contained within each portal page to be presented via their respective placeholders to a user at the same time.

In accordance with another embodiment of the present invention, a method to detach and reattach at least one portal page associated with a portal environment may include detaching a selected portal page in response to activating a detach feature or element. The method may also include transferring the selected, detached portal page to a separate window or page in response to detaching the selected portal page. The method may further include forming a placeholder in the portal environment for each detached portal page when detached, wherein the placeholder is formed in response to the portal page being detached and wherein the placeholder is substantially smaller than the portal page to permit a plurality of portal pages and at least one portlet contained within each portal page to be presented via their respective placeholders to a user at the same time.

In accordance with another embodiment of the present invention, a method to form a portal environment may include providing at least one portal pages with a detach feature. The method may also include providing communication between the portal environment and the at least one portal page in response to the at least one portal page being detached. The method may further include providing a placeholder in the portal environment associated with the at least one portal page when detached, wherein the placeholder is formed in response to the portal page being detached and wherein the placeholder is substantially smaller than the portal page to permit a plurality of portal pages and at least one portlet contained within each portal page to be presented via their respective placeholders to a user at the same time.

In accordance with another embodiment of the present invention, a system to detach and reattach a portal page to a portal environment may include a portal server. The system may also include at least one portal page accessible via the portal server. The at least one portal page may include a detach feature to detach the at least one portal page from an associated portal environment.

In accordance with another embodiment of the present invention, a computer-readable medium have computer-executable instruction for performing a method that may include detaching a selected portal page from a portal environment in response to activation of a detach feature. The method may also include reattaching the detached portal page in response to activation of a reattach feature.

BRIEF DESCRIPTION OF DRAWINGS

FIG. 2 is a flow chart of an exemplary method to form a portal environment and to detach at least one portal page associated with the portal environment in accordance with an embodiment of the present invention.

FIG. 3 is a flow chart of an exemplary method to reattach a portal page associated with a portal environment in accordance with an embodiment of the present invention.

FIG. 4 is a flow chart of an exemplary method to form a portal page and to detach at least one portlet associated with the portal page in accordance with an embodiment of the present invention.

FIGS. 5A, 5B, 5C and 5D (collectively FIG. 5) illustrate an example of portlets forming at least one portal page which forms a portal environment and illustrate an example of sequentially detaching and reattaching a portal page to an associated portal environment and detaching and reattaching a portlet to an associated portal page in accordance with an embodiment of the present invention.

DETAILED DESCRIPTION

The following detailed description of preferred embodiments refers to the accompanying drawings, which illustrate specific embodiments of the invention. Other embodiments having different structures and operations do not depart from the scope of the present invention.

FIG. 2 is a flow chart of an exemplary method 200 to form a portal environment or collection of portal pages and to detach at least one portal page associated with the portal environment in accordance with an embodiment of the present invention. In block 202, one or more portal pages may be formed including a detach feature or element. The portal pages may be formed, written or created using a web-based programming language, such as Java™, hypertext markup language (HTML) or the like. The detach feature may include an icon or other graphical symbol representative of a feature or function to pop-out, undock or detach an associated portal page from a portal environment or web page in which the portal page may be accessed and presented. Detaching or undocking one or more portal pages from the portal environment permits the user to view and interact with multiple portal pages simultaneously or to interact with portlets contained on different portal pages at the same time. Portal pages may be active and communicate with the portal environment or website and interact with other portal pages when detached or undocked. Additionally, portlets on separate portal pages may interact with one another even though one or more of the portal pages may be detached or undocked.

As discussed in more detail below, the portal page when detached, undocked or popped-out may be represented in the portal environment or website by a placeholder, a re-attach icon or symbol within the portal environment or website. The contents of the detached or undocked portal page are replaced by the placeholder or re-attach icon. The placeholder or re-attach icon may be much smaller than the detached portal page to take less space in the portal environment or website to unclutter the website and make it easier to navigate on a user's desktop. When detached and replaced by the placeholders, multiple portal pages may be active and viewed via their corresponding placeholders on a user's desktop at any given time. Because multiple portal pages can be active and displayed via their respective placeholders simultaneously, users have an ability to refresh the portal pages and dynamically update the portal pages. The placeholder or re-attach icon may also serve the purpose to control re-attaching or re-docking a detached portal page as discussed in more detail herein with reference to FIG. 3.

Figure 5A:
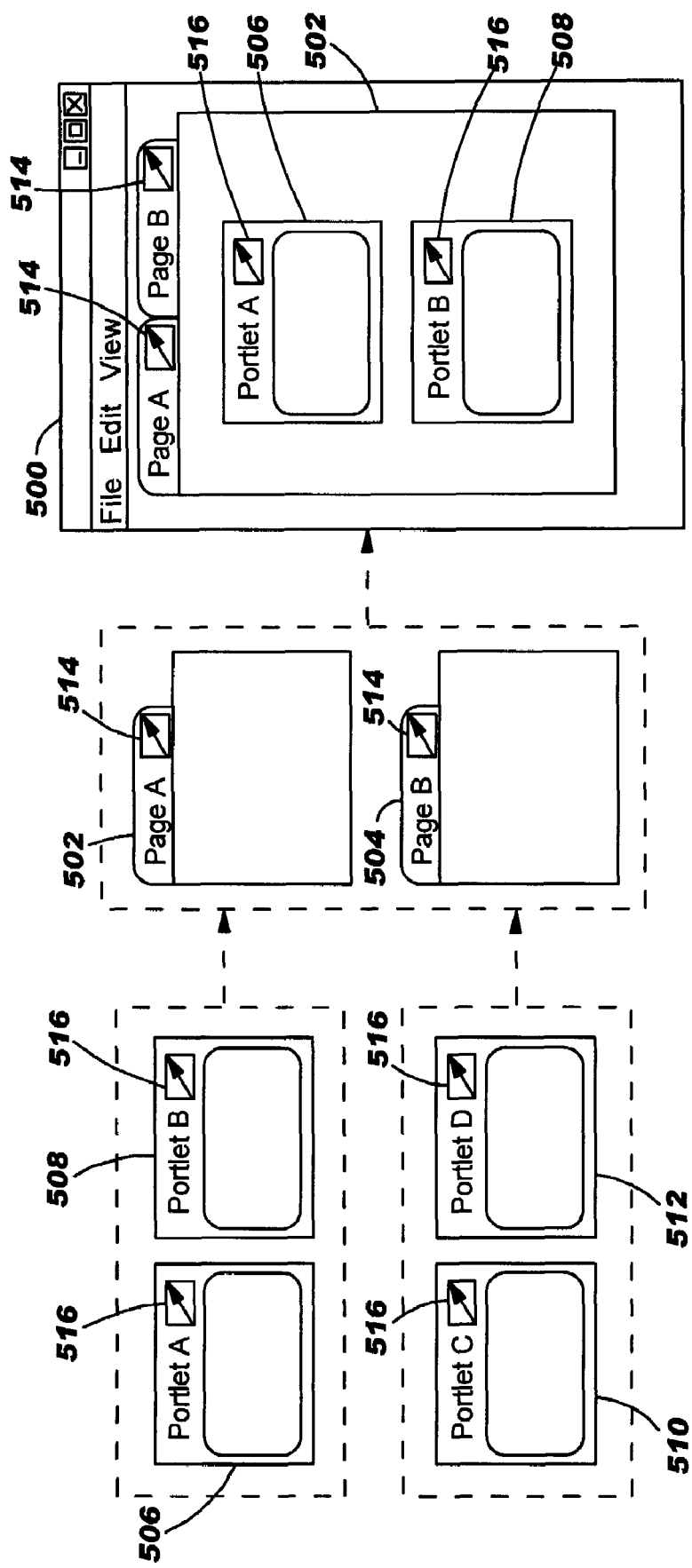

In block 204, a portal environment may be formed incorporating one or more portal pages that may each include a detach feature or element. The portal environment may also include other portal pages that do not have the detach feature. Referring also to FIG. 5A, FIG. 5A illustrates an example of a portal environment 500 including a plurality of portal pages, such as portal page A 502 and portal page B 504. Each portal page 502 and 504 may include a plurality of portlets. For example, portal page A 502 may include portlet A 506 and portlet B 508. Portal page B 504 may include portlet C 510 and portlet D 512. Each portal page 502 and 504 may include a detach function 514 or element. Additionally, as discussed in more detail with respect to FIG. 4 and FIGS. 5B and 5C, each portlet 506-512 may also include a detach or undock feature 516 or element.

In block 206 (FIG. 2), the detach feature, icon or symbol of a portal page (element 514 in FIGS. 5A-5D) may be activated by a user clicking on the icon or symbol using a computer mouse or other pointing device. In block 208, an independently managed window or page may be formed in response to the detach feature or icon 514 being activated. Forming independently managed windows or pages is known by those skilled in the art. An independently managed window may be formed or created for each detached portal page. In block 210, the detached portal page may be transferred to the independently managed window or page. In block 212, a placeholder or reattach icon may be formed in the portal environment to represent and hold the place for the detached portal page. The placeholder or reattach icon may be substantially smaller than the original portal page because of less content to occupy much less space or real estate in the portal environment. Replacing the detached portal page with a smaller placeholder also unclutters the portal environment and permits more than one portal page to be presented to a user or in a user's desktop at the same time. The portal pages and portlets contained within each of the portal pages may also communicate and interact with one another. The user may also interface and interact with the portal pages and portlets at the same time. The place-holder or reattach icon may also include a reattach feature or element that may be operated or activated by a user to reattach or transfer the contents of the portal page back into the portal environment or website. The reattach feature or element may include an icon or symbol representative of the function of transferring the contents of the portal page back into the portal environment. Thus, the contents of the popped-out or detached portal page may be replaced with a placeholder including a reattach function or icon within the portal environment.

In block 214, a communication tunnel or tunneling communication may be established or formed between the portal environment or placeholder and the detached portal page. Accordingly, communication with the detached portal page through the portal environment may continue. This permits a user to interact with the detached portal pages and portlets contained therein and permits the detached portal pages and portlets to interact with one another.

Referring also to FIG. 5C, FIG. 5C illustrates portal page A 502 being detached or popped-out of the portal environment 500. Portal page A 502 and its contents may be transferred to an independently managed window or page 518 or the like and a placeholder 520 may replace portal page A 502 in the portal environment 500. The placeholder 520 may include a reattach feature or icon 522. The detached portal page A 502 in the window 518 may also include a reattach element, feature or icon 524. Tunneling communication 526 may be created or established between the detached portal page A 502 and the placeholder 520 or portal environment 500 for communication between the detached portal page A 502 and other portal pages that may be either detached or otherwise. The tunneling communication 526 also permits communication between portlets contained in the detached portal page 502 and portlets in other portal pages that may be detached or still contained within the portal environment 500.

Referring back to FIG. 2, in block 216, a determination may be made if a detach feature or icon has been activated on any other portal pages. If so, the method 200 may return to block 208 and the method 200 may continue as previously described with respect to blocks 208-216. If the detach feature, element or icon has not been activated for any other selected portal page, the method 200 may end at termination 218.

FIG. 3 is a flow chart of an exemplary method 300 to reattach a portal page associated with a portal environment in accordance with an embodiment of the present invention. In block 302, a reattach feature or element may be activated by clicking on a reattach icon or symbol on the placeholder or on the detached portal page in the independently managed page. Referring also to FIG. 5D, FIG. 5D illustrates an example of activating the reattach feature or element by clicking on a reattach icon or symbol 522 associated with the placeholder 520 or by clicking on a reattach icon or symbol 524 associated with the detached portal page A 502.

In block 304, the detached portal page may be transferred from the independently managed window 518 or page back to the portal environment 500 in response to activating or clicking on either the reattach icon 522 associated with the placeholder 520 or the reattach icon 524 or feature associated with the detached portal page A 502. In block 306, a determination may be made if a reattach feature or icon has been activated on another selected, detached portal page or associated placeholder. If a reattach feature has been activated on another detached portal page or associated placeholder, the method 300 may return to block 302 and the method 300 may proceed as previously described with respect to blocks 302-306. If a reattach feature has not been activated on any other detached portal page or placeholder, the method 300 may end at termination 308 until a reattach feature is activated.

FIG. 4 is a flow chart of an exemplary method 400 to form a portal page and to detach at least one portlet associated with the portal page in accordance with an embodiment of the present invention. The method 400 may be similar to that described in co-pending patent application Ser. No. 10/708,971, filed Apr. 5, 2004, entitled "Portal Including Detachable and Reattachable Portlets," which is incorporated herein in its entirety by reference as discussed above. In block 402, one or more portlets may be formed including a detach feature or element. The portlets may be formed, written or created using a web-based programming language, such as Java™, hypertext markup language (HTML) or the like. The detach feature may include an icon or other graphical symbol representative of a feature or function to pop-out, undock or detach an associated portlet from a portal page in which the portlet may be accessed or presented. Detaching a portlet may effectively remove the portlet from the portal page. As discussed in more detail below, the portlet when detached or popped-out may be represented in the portal page by a small placeholder or symbol representative of the portlet. Detaching one or more portlets makes the portal less crowded or cluttered and provides more space in the portal page for other portlets that may be more useful to a particular user. Detaching one or more portlets may also make the portal page easier to navigate.

In block 404, a portal page may be formed incorporating one or more portlets that include a detach feature or element. The portal page may also include other portlets that do not have the detach feature. Referring also to FIG. 5A, FIG. 5A illustrates an example of a portal page 502 including a plurality of portlets, portlet A 506 and portlet B 508. Each portlet 506 and 508 may include a detach function 516 or element. In block 406 (FIG. 4), the detach feature or element (element 516 in FIG. 5B) may be activated by a user clicking on the icon or symbol 516 using a computer mouse or other pointing device.

In block 408, an independently managed window or page may be formed or created in response to the detach feature 516 being activated. Forming independently managed windows or pages is known by those skilled in the art. An independently managed window may be formed or created for each detached portlet. Alternatively, one or more portlet windows or pages may be formed to retain all detached portlets depending upon the quantity and size of the contents of the detached portlets and the number of windows needed to retain or house the detached portlets. In block 410, the detached portlet may be transferred to the independently managed window or page. In block 412, a placeholder may be formed in the portal page to represent and hold the place for the detached portlet. The placeholder may be substantially smaller than the original portlet because of less content to occupy much less space or real estate in the portal page and to unclutter the portal page. The placeholder may also include a reattach feature or element that may be operated or activated to reattach or transfer the contents of the portlet back into the portal page. The reattach feature or element may include an icon or symbol representative of the function of transferring the contents of the portlet back into the portal page. Thus, the contents of the popped-out or detached portlet may be replaced with a placeholder including a reattach function or icon within the portal page. In block 414, a communication tunnel or tunneling communication may be established or formed between the portal page or placeholder and the detached portlet. Accordingly, communication with the detached portlet through the portal page may continue.

Referring also to FIGS. 5B and 5C, FIGS. 5B and 5C illustrates portlet A 506 being detached or popped-out of the portal page 502. Portlet A 506 and its contents may be transferred to an independently managed window or page 526 or the like and a placeholder 528 may replace portlet A 506 in the portal page 502. The placeholder 528 may include a reattach element or feature 530. The detached portlet A 506 in the window 526 may also include a reattach element or feature 532. Tunneling communication 534 may be created or established between the detached portlet A 506 and the placeholder 530 or portal page 502.

Referring back to FIG. 4, in block 416, a determination may be made if a detach feature has been activated on any other portlets. If so, the method 400 may return to block 408 and the method 400 may continue as previously described with respect to blocks 408-416. If the detach feature or element has not been activated for any other selected portlets, the method 400 may end at termination 418.

The detached or undocked portlet 506 may be reattached similar to that described in co-pending patent application Ser. No. 10/708,971 or analogous to that described in FIG. 3 with respect to reattaching a detached portal page to the portal environment or website. The reattach feature or icon 530 (FIG. 5C) in the placeholder 528 may be activated by clicking with a computer mouse or pointing device or by other means to reattach detached portlet A 506 to the portal page 502. Alternatively, the reattach icon 532 in the detached portlet A 506 may be activated by clicking with a computer pointing device or the like to cause the detached portlet A 506 to be reattached to the portal page 502.

Figure 1:
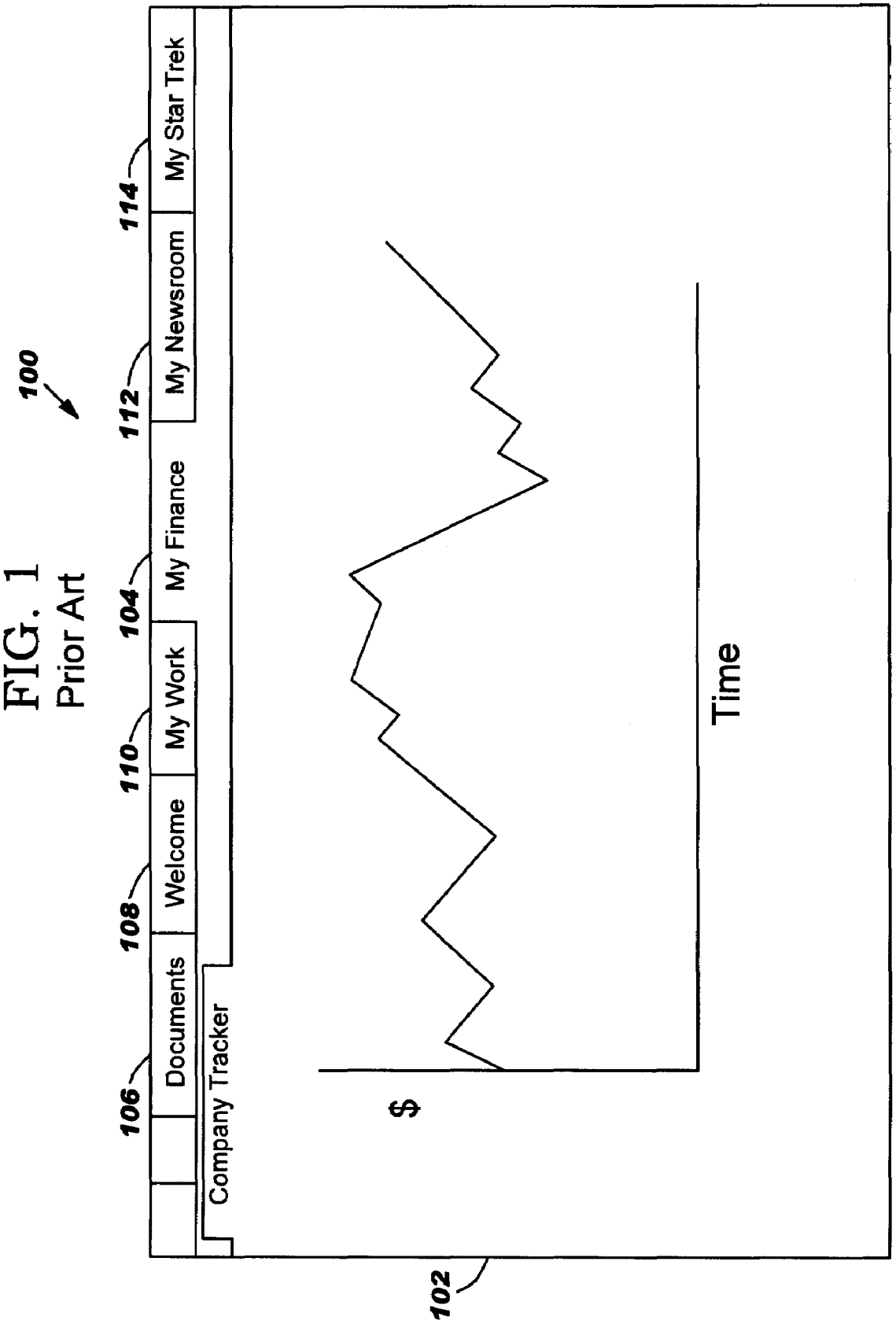
FIG. 1 is an example a portal environment including tabs for access to corresponding portal pages.
Figure 6:
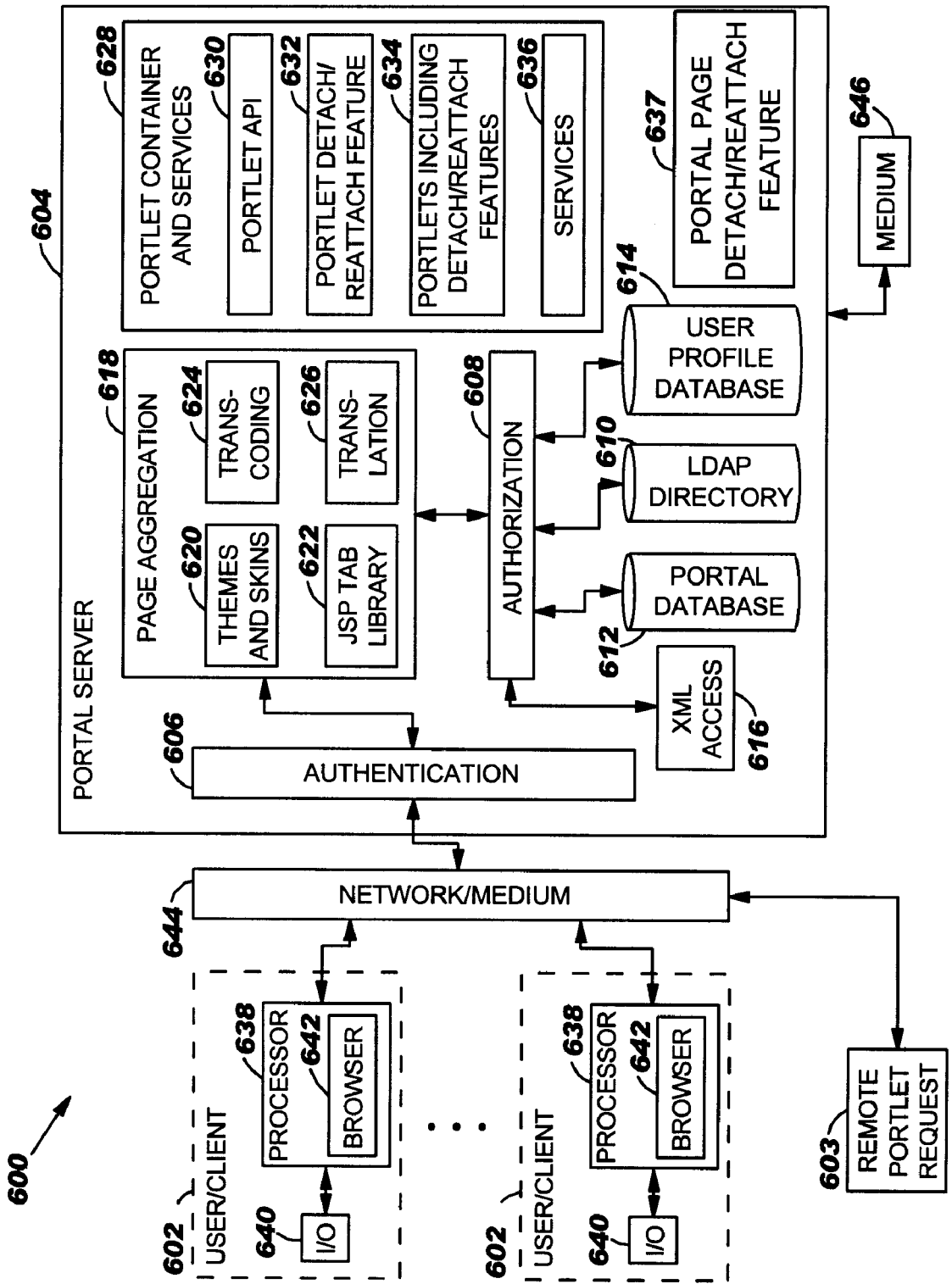
FIG. 6 is an example of a system to present a portal environment to a user and to provide the ability for the user to detach and reattach selected portal pages to an associated portal environment and to detach and reattach selected portlets to an associated portal page in accordance with an embodiment of the present invention.

FIG. 6 is an example of a system 600 to present a portal environment to one or more users or clients 602 and to provide the ability for the user 602 to detach and reattach selected portal pages to an associated portal environment or to detach and reattach selected portlets to an associated portal page in accordance with an embodiment of the present invention. The user or client 602 may be a desktop or mobile computing system, cellular telephone, personal digital assistance or the like. The system 600 may also be accessed by a remote portlet request 603 from another server or system. Elements of the methods 200, 300 and 400 of FIGS. 1, 3 and 4 may be embodied in the system 600. The system 600 may include a portal server 604. The portal server 604 may provide common services, such as application connectivity, integration, administration, and presentation capabilities that may be needed across all portal environments. The portal server 604 may include an authentication element 606 to establish a user's identity. The portal server 604 may use form-based authentication. In form-based authentication, a user may be prompted through an HTML form or the like to enter a user ID and password for authentication when trying to access a particular portal, portal environment or website. After receiving the user's identification and password information, the portal server 604 may validate the authentication information via an authorization element 608. The portal server 604 may validate the authentication information against information contained in a Lightweight Directory Access Protocol (LDAP) directory 610. The authorization element 608 or process may also determine which pages or portlets a user has permission to access. The authorization element 608 may access the LDAP directory 610, portal database 612, and user profile database 614 in determining proper authentication, which portals are accessible by the user and other privileges or settings. The authorization element 608 may also interface with an extensible markup language (XML) access element 616.

The portal server 604 may also include a page aggregation element 618. Components of the page aggregation element 618 may be embodied in hardware or software. The page aggregation element 618 may include a themes and skins module 620. Users may be able to customize or personalize pages including for example, a choice of color themes, skins and page layouts. Themes may be used to define fonts, colors, spacing and other visual elements. Themes may consist of cascading style sheets, Java Script Page (JSP) files, images or the like. Skins may be decorations and controls placed around portlets, such as title bars, borders, shadows, or similar treatments. The page aggregation element 618 may also include a JSP tab library 622, transcoding module 624 and translation module 626 to further facilitate portal customization and presentation of the portal and portlets to the user 602.

The portal server 604 may also include a portlet container and services element 628. Components of the portlet container and services element 628 may be embodied in hardware or software. The portlet container and service element 628 may include a portlet Application Programming Interface (API) 630. Portlets rely on portal infrastructure to access user profile information, participate in window and action events, communicate with other portlets, access remote content, lookup credentials, store persistent data and perform other functions. The portlet API 630 provides standard interfaces for these functions or services.

The portlet container and services module 628 may also include a portlet detach/reattach feature 632 and portlets 634 or information to form portlets. The portlet detach/reattach feature 632 may include or embody the method 400 of FIG. 4 or the portlet detach and reattach features described in co-pending patent application Ser. No. 10/708,971 which is incorporated herein by reference. The portlets 634 may include portlets having detach and reattach features and portlets without such features. The portlet container and services module 628 may also include other services or functions 636. Examples of other services or functions 636 may include, but is not limited to, content access, web page clipping, searching, document administration, portlet proxy, single sign on and the like.

The server 604 may also include a portal page detach and reattach feature 637. The portal page detach and reattach feature may include or embody methods 200 and 300 of FIGS. 2 and 3 respectively. The graphical user interfaces to form portal pages 502 and 504 and the portal environment 500 (FIGS. 5A-5D) may also be embodied in portal page detach and reattach feature 637.

Each user 602 or client may include a processor 638 and input/output devices 640. A browser or web browser 642 may operate on the processor 638 to facilitate accessing the portal server 604. The input/output devices 640 may include separate input devices, output devices or combination input/output devices. The input/output devices 640 may include a keyboard, pointing device, voice recognition system or the like. The input/output devices 640 may also include optical, magnetic, infrared or radio frequency devices, disk drives or the like. The input devices 640 may receive read or download software, computer-executable or readable instructions or the like, such as software that may embody elements of the methods 200, 300 and 400 of FIGS. 2, 3 and 4.

Each user 602 may access the portal server 604 via a communication network or medium 644. The communication network or medium 644 may be any communication system including by way of example, dedicated communication lines, telephone networks, and wireless data transmission systems, two-way cable systems, and customized computer networks, interactive kiosk networks, the Internet and the like.

Elements of the present invention, such as methods 200 and 300 and 400 of FIGS. 2, 3 and 4 respectively, and system 600 of FIG. 6, may be embodied in hardware and/or software as a computer program code that may include firmware, resident software, microcode or the like. Additionally, elements of the invention may take the form of a computer program product on a computer-usable or computer-readable storage medium having computer-usable or computer-readable program code embodied in a medium for use by or in connection with a system, such as system 600 of FIG. 6. Examples of such a medium may be illustrated in FIG. 6 as I/O devices 640 or medium 644 or 646. A computer-usable or readable medium may be any medium that may contain, store, communicate or transport the program for use by or in connection with a system. The medium, for example, may be an electronic, magnetic, optical, electromagnetic, infrared or semiconductor system or the like. The medium may also be simply a stream of information being retrieved when the computer program product is "downloaded" through a network, such as the Internet or the like. The computer-usable or readable medium could also be paper or another suitable medium upon which the program may be printed.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method to detach and reattach at least one portal page associated with a portal environment, comprising:

detaching a selected portal page in response to activating a detach feature;

reattaching the detached portal page in response to activating a reattach feature; and forming a placeholder in the portal environment for each detached portal page when detached, wherein the placeholder is formed in response to the portal page being detached and wherein the placeholder is substantially smaller than the portal page to permit a plurality of portal pages and at least one portlet contained within each portal page to be presented via their respective placeholders to a user at the same time.

2. The method of claim 1, further comprising transferring the selected, detached portal page to a window in response to activating the detach feature.

3. The method of claim 1, further comprising forming an independently managed window for the detached portal page.

4. The method of claim 1, further comprising forming the reattach feature associated with at least one of each placeholder and each detached portal page.

5. The method of claim 4, further comprising transferring a detached portal from a window to the portal environment in response to activating the reattach feature.

6. The method of claim 1, further comprising forming a communication tunnel between the portal environment and the detached portal page.

7. The method of claim 1, further comprising:

detaching a selected portlet in response to activating a portlet detach feature;

reattaching the detached portlet in response to activating a portlet reattach feature; and forming a portlet placeholder formed in the detachable portal page to represent the selected portlet when detached, wherein the portlet placeholder is formed in response to the selected portlet being detached.

8. A method to detach and reattach at least one portal page associated with a portal environment, comprising:

detaching a selected portal page in response to activating a detach feature; and transferring the selected, detached portal page to a window in response to detaching the selected portal page; and forming a placeholder in the portal environment for each detached portal page when detached, wherein the placeholder is formed in response to the portal page being detached and wherein the placeholder is substantially smaller than the portal page to permit a plurality of portal pages and at least one portlet contained within each portal page to be presented via their respective placeholders to a user at the same time.

9. The method of claim 8, further comprising forming an independently managed window for each detached portal page.

10. The method of claim 8, further comprising forming a reattach feature on at least one of each placeholder and each detached portal page.

11. The method of claim 8, further comprising transferring the detached portal page from the window to the portal environment in response to activating a reattach feature.

12. A method to form a portal environment, comprising:

providing at least one portal page with a detach feature;

providing communication between the portal environment and the at least one portal page in response to the at least one portal page being detached; and providing a placeholder in the portal environment associated the at least one portal page when detached, wherein the placeholder is formed in response to the portal page being detached and wherein the placeholder is substantially smaller than the portal page to permit a plurality of portal pages and at least one portlet contained within each portal page to be presented via their respective placeholders to a user at the same time.

13. The method of claim 12, further comprising providing a window to receive each detached portal page.

14. The method of claim 12, further comprising providing a reattach feature associated with the at least one portal page in response to the portal page being detached.

15. The method of claim 12, further comprising providing a reattach feature to be associated with at least one of the placeholder and the at least one portal page in response to the at least one portal page being detached.

16. The method of claim 12, further comprising providing tunneling communication between the placeholder and the at least one portal page in response to the at least one portal page being detached.

* * * * *